US008079299B2

(12) United States Patent
Messmer et al.

(10) Patent No.: US 8,079,299 B2
(45) Date of Patent: Dec. 20, 2011

(54) UPPER PART OF A COMPOSITE PISTON

(75) Inventors: Dieter Messmer, Remseck (DE); Christof Geissler, Freudenstadt (DE); Roland Schmidt, Backnang (DE)

(73) Assignee: MAHLE International GmbH, Stuttgart (DE)

( * ) Notice: Subject to any disclaimer, the term of this patent is extended or adjusted under 35 U.S.C. 154(b) by 609 days.

(21) Appl. No.: 12/225,900

(22) PCT Filed: Mar. 23, 2007

(86) PCT No.: PCT/DE2007/000536

§ 371 (c)(1), (2), (4) Date: Oct. 21, 2008

(87) PCT Pub. No.: WO2007/115528

PCT Pub. Date: Oct. 18, 2007

(65) Prior Publication Data

US 2009/0173224 A1 Jul. 9, 2009

(30) Foreign Application Priority Data

Apr. 4, 2006 (DE) ........................ 10 2006 015 587

(51) Int. Cl.
*F02F 3/00* (2006.01)
*F16J 1/00* (2006.01)

(52) U.S. Cl. ........................................... 92/222; 92/217

(58) Field of Classification Search .................... 92/216, 92/217, 220, 222

See application file for complete search history.

(56) References Cited

U.S. PATENT DOCUMENTS

| | | | |
|---|---|---|---|
| 3,465,651 | A | 9/1969 | Tromel |
| 4,356,800 | A | 11/1982 | Moebus |

FOREIGN PATENT DOCUMENTS

| | | | |
|---|---|---|---|
| CH | 406 736 | | 1/1966 |
| DE | 28 32 970 | | 2/1980 |
| DE | 29 36 630 | | 3/1981 |
| DE | 36 33 134 | | 4/1988 |
| DE | 3633134 | A * | 4/1988 |
| DE | 39 26 791 | | 2/1991 |
| DE | 41 29 746 | | 4/1993 |
| DE | 4129746 | A1 * | 4/1993 |
| DE | 600 01 156 | | 10/2003 |
| EP | 1 264 979 | | 12/2002 |
| JP | 08-210180 | | 8/1996 |
| WO | WO 2005/121537 | | 12/2005 |
| WO | WO 2005121537 | A1 * | 12/2005 |

OTHER PUBLICATIONS

International Search Report.

* cited by examiner

*Primary Examiner* — Thomas E Lazo

(74) *Attorney, Agent, or Firm* — Collard & Roe, P.C.

(57) ABSTRACT

An upper part (1) of an assembled piston is disclosed, comprising a radially directed inner contact surface (2) arranged on the underside of an annular rib (15) and a radially directed outer contact surface (3) arranged on the underside of an annular wall (25), the outer (3) and the inner contact surface (2) each having a grooved profile in the form of concentric grooves with an average depth between $R_z$ 10 and $R_z$ 30. The wear on the contacting surfaces of the upper piece and the lower piece of the assembled piston is thus reduced.

5 Claims, 1 Drawing Sheet

UPPER PART OF A COMPOSITE PISTON

CROSS REFERENCE TO RELATED APPLICATIONS

This application is the National Stage of PCT/DE2007/000536 filed on Mar. 23, 2007, which claims priority under 35 U.S.C. §119 of German Application No. 10 2006 015 587.4 filed on Apr. 4, 2006. The international application under PCT article 21(2) was not published in English.

The invention relates to an upper part of a composite piston.

A composite piston consisting of an upper part and a lower part is known from the patent DE 36 33 134 C2, in which a highly wear-resistant layer is disposed between the surfaces of the upper part and the lower part that are in contact with one another, in order to reduce the friction wear of these surfaces. The layer is applied to one of the two contact surfaces according to the detonation spray method, in order to guarantee good adhesion of the layer to the contact surface. The layer can consist of a tungsten carbide/cobalt alloy, or of a copper/nickel/indium alloy. This brings with it the disadvantage that both the materials of which the layer can consist and the detonation spray method are very cost-intensive.

It is the task of the invention to avoid this disadvantage of the state of the art. This task is accomplished with the characteristics that stand in the characterizing part of the main claim, whereby it is a way that is simple to implement and therefore price-advantageous, for avoiding wear of the contact surfaces of the upper part and lower part of a composite piston, to provide the contact surface of the upper part with a groove-shaped profile.

Practical embodiments of the invention are the object of the dependent claims.

Figure 1:
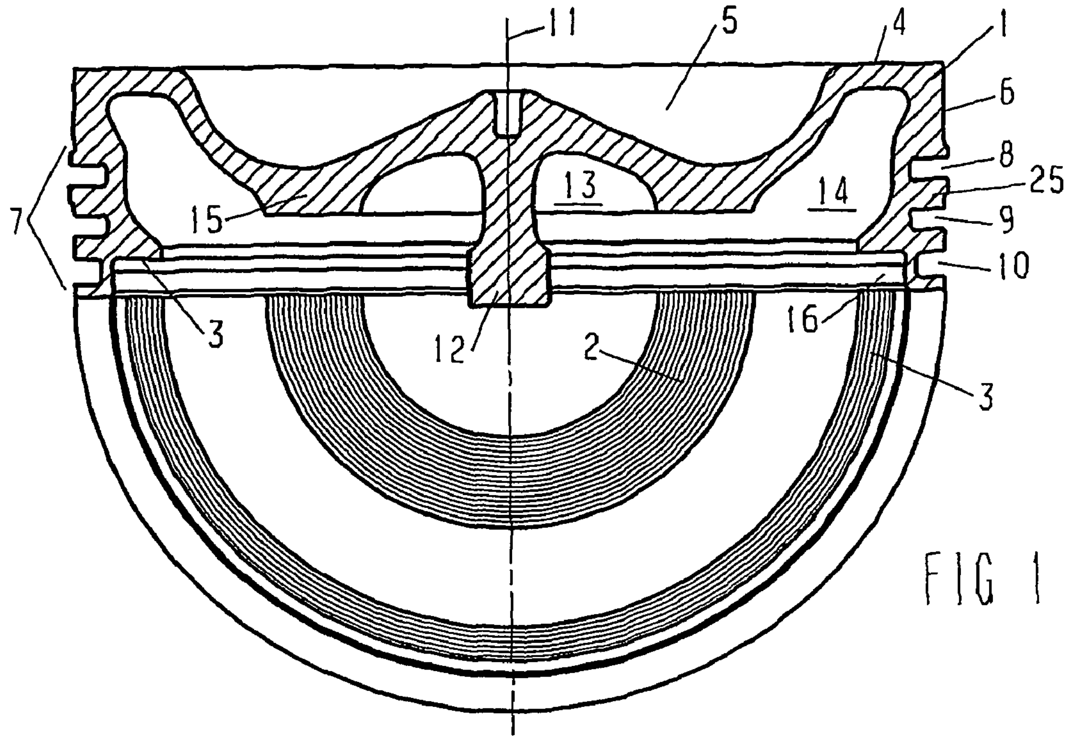
Figure 2:
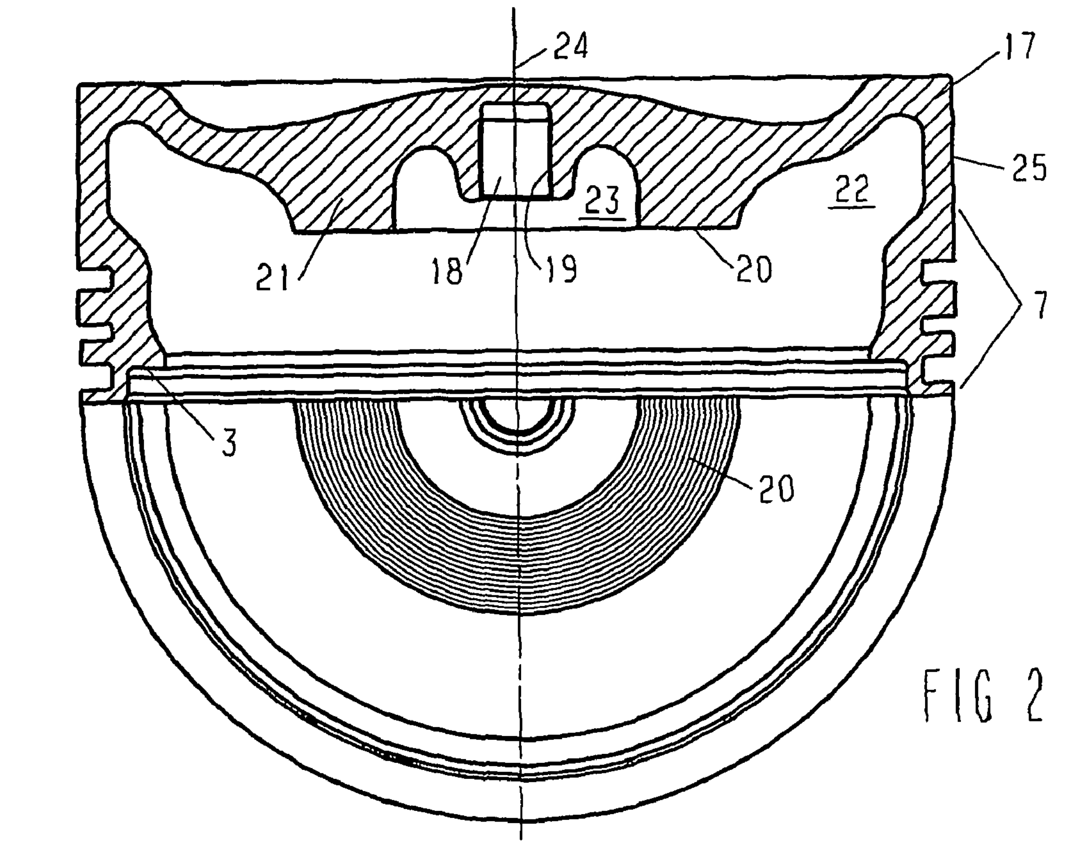

Some exemplary embodiments of the invention will be described below, using the drawings. These show:

FIG. 1 an upper part of a piston, which has a threaded bolt disposed in the center, to screw the upper part to the lower part, and its bottom view, half of which is shown, and FIG. 2 an upper part of a piston, which has a dead-end bore disposed in the center, having an inside thread, for accommodating a screw, whereby the upper part is screwed to the lower part, and its bottom view, half of which is shown.

FIG. 1 shows an upper part 1 of a piston, the lower part of which is not shown in the figure. Half of the bottom view of the upper part 1 is shown in FIG. 1, showing an inner, radially oriented contact surfaces 2 and an outer, radially oriented contact surface 3, whereby the upper part 1 rests on the lower part of the piston 1 by way of the contact surfaces 2 and 3. The upper part 1 is made of steel. The lower part can consist of steel, of aluminum, or of cast iron with spheroidal graphite.

The upper part 1 has a combustion bowl 5 formed into its piston crown 4. The region of the radial outside of the upper part 1, on the piston crown side, is configured as a top land 6 that is followed, in the direction facing away from the piston crown, by a ring belt 7 having three ring grooves 8, 9, and 10.

The underside of the upper part 1, facing away from the piston crown, has a threaded bolt 12, coaxial to the piston axis 11, by way of which the upper part 1 is screwed to the lower part of the piston. A radially inner, ring-shaped recesses 13 and a radially outer, ring-shaped recess 14 are disposed on the underside of the upper part 1, concentric to the piston axis 11 and concentric to one another, which form ring channels for passing through cooling oil, together with recesses in the lower part, on the piston crown side. The inner recess 13 is delimited, radially on the inside, by the threaded bolt 12, and radially on the outside by a ring rib 15 disposed between the recesses 13 and 14. The outer recess 14 is delimited, radially on the inside, by the ring rib 15, and radially on the outside by a ring wall 25 formed onto the piston crown 4, on the radial outside of which wall the top land 6 and the ring belt 7 are disposed.

The underside of the ring rib 15, facing away from the piston crown, carries the inner contact surface 2. Radially on the inside, a circumferential recess 16 is formed into the end region of the ring wall 25, facing away from the piston crown, which recess has the outer contact surface 3.

Because of the ignition pressures that have risen in newer engines, the composite pistons used in them, which consist of an upper part and a lower part, whereby the upper part is screwed to the lower part, the contact pressure and the relative movements between the surfaces of the upper part and the lower part that are in contact with one another, are also increasing. The results are increased friction wear (fretting) of the contact surfaces as the result of material welding (microwelding), with partial material dissolution that is attributable to it.

In experiments, it has been shown that this can be remedied by roughing up the contact surfaces 2 and 3 of the upper part 1 of the piston, whereby a groove-shaped profile has proven to be particularly effective in avoiding wear of the contact surfaces 2, 3, which has a roughness between $R_z$ 10 and $R_z$ 25, i.e. a profile structure in which the average deviation of the profile from an O axis, in the positive and the negative direction, amounts to 10 μm to 25 μm. In this connection, the profile of the contact surfaces 2 and 3 can have the shape of concentric grooves (see standard DIN EN ISO 1302, designated with the graphic symbol C), with a groove spacing of 300 to 1200 μm, as it is shown in FIG. 1. This profile can be produced in particularly simple and price-advantageous manner by means of lathing or use of a laser.

A profile having a groove shape that is likewise based on the standard DIN EN ISO 1302, and designated, in greater detail, with the graphic symbols X (crossed grooves) or the graphic symbol R (grooves in the form of radially disposed lamellae), is also possible.

FIG. 2 shows the upper part 17 of a composite piston, which differs from the upper part 1 shown in FIG. 1 in that it has a dead-end bore 18 having an inside thread 19, disposed on the underside, facing away from the piston crown, disposed coaxial to the piston axis 24, into which bore a screw can be screwed, to assemble the upper part 17 to a lower part, not shown in FIG. 2. Another difference between the upper parts 1 and 17 consists in the fact that in the case of the upper part 17, only the inner contact surface 20 of the ring rib 21, facing away from the piston crown and oriented radially, which surface is disposed between an outer recess 22 and an inner recess 23, on the underside of the upper part 17, has a profile in the form of concentric grooves, which is shown by the bottom view of the upper part 17, half of which is shown. The profiling shown in FIG. 2, of only one of the two contact surfaces, is sufficient in the case of lower ignition pressures of pistons subject to less stress.

To avoid wear of the contact surfaces of upper part and lower part of a composite piston, it is also possible to provide one or more radially oriented contact surfaces of the lower piston part, on the piston crown side, with the groove-shaped profiling, which has the aforementioned dimensions, i.e. roughness and groove spacing, and the DIN shapes indicated above.

REFERENCE SYMBOL LIST

1 upper part of a composite piston
2 inner contact surface

3 outer contact surface
4 piston crown
5 combustion bowl
6 top land
7 ring belt
8, 9, 10 ring groove
11 piston axis
12 threaded bolt
13 inner recess
14 outer recess
15 ring rib
16 recess
17 upper part of a composite piston
18 dead-end bore
19 inside thread
20 inner contact surface
21 ring rib
22 outer recess
23 inner recess
24 piston axis
25 ring wall

The invention claimed is:

1. An upper part of a composite piston, comprising:

a piston crown, a ring wall that is formed onto the piston crown, in the direction facing away from the piston crown, on the radial outer surface of which wall a ring belt is disposed, an outer recess formed into the underside facing away from the piston crown, which recess is delimited radially on the outside by the ring wall, and radially on the inside by a ring rib formed onto the underside of the upper part, an inner contact surface formed by the underside of the ring rib (15, 21) and oriented radially, and an outer contact surface (3) formed by the underside of the ring wall (25) and oriented radially, wherein the inner contact surface has a groove-shaped profile having an average roughness depth between $R_z$ 10 and $R_z$ 30.

2. The upper part of a composite piston according to claim 1, wherein the roughness depth of the profile lies between $R_z$ 10 and $R_z$ 25.

3. The upper part of a composite piston according to claim 1, wherein the profile has the shape of concentrically disposed grooves having a groove spacing between 300 μm and 1200 μm.

4. The upper part of a composite piston according to claim 1, wherein in addition to the inner contact surface , the outer contact surface also has a groove-shaped profile having an average roughness depth between $R_z$ 10 and $R_z$ 30.

5. The upper part of a composite piston according to claim 4, wherein the profile has the shape of concentrically disposed grooves having a groove spacing between 300 μm and 1200 μm.

* * * * *